United States Patent [19]

Suzuki et al.

[11] Patent Number: 4,991,921
[45] Date of Patent: Feb. 12, 1991

[54] PN JUNCTION OPTICAL MODULATING DEVICE HAVING A BUFFER LAYER WITH SMALL ENERGY GAP

[75] Inventors: Masatoshi Suzuki; Hideaki Tanaka; Shigeyuki Akiba; Yuichi Matsushima, all of Tokyo, Japan

[73] Assignee: Kokusai Denshin Denwa Kabushiki Kaisha, Tokyo, Japan

[21] Appl. No.: 442,521

[22] Filed: Nov. 27, 1989

[30] Foreign Application Priority Data

Dec. 1, 1988 [JP] Japan .................................. 63-302222

[51] Int. Cl.$^5$ .......................... G02B 6/10; H01S 3/00; H01S 3/19; H01L 29/61
[52] U.S. Cl. ............................. 350/96.14; 350/96.13; 372/45; 357/16; 330/4.3
[58] Field of Search ............... 350/96.11, 96.12, 96.13, 350/96.14; 332/7.51; 357/17, 16; 372/45, 46

[56]  References Cited
U.S. PATENT DOCUMENTS

| 4,743,087 | 5/1988 | Utaka et al. ................. 350/96.13 X |
| 4,807,952 | 2/1989 | Jaeger et al. ..................... 350/96.14 |
| 4,811,353 | 3/1989 | Noda et al. ............................ 372/45 |
| 4,837,526 | 6/1989 | Suzuki et al. ................ 350/96.14 X |
| 4,913,506 | 4/1990 | Suzuki et al. ..................... 350/96.14 |

FOREIGN PATENT DOCUMENTS 0354058  2/1990  European Pat. Off. .

Primary Examiner—Akm Ullah
Attorney, Agent, or Firm—Emmanuel J. Lobato; Robert E. Burns

[57]  ABSTRACT

An optical modulating device is disclosed which has, on a substrate directly or via a lower cladding layer, an optical waveguide layer, an upper cladding layer of a refractive index smaller than that of the optical waveguide layer and a pair of electrodes for applying an electric field across the substrate and the upper cladding layer and in which the absorption coefficient for incident light of a fixed intensity incident to the optical waveguide layer is varied by the electric field applied across the pair of electrodes to perform the modulation of the light and the modulated light is emitted from a light emitting end face of the optical waveguide layer. In accordance with the present invention, a pn junction is formed in the upper cladding layer and at least one buffer layer of an energy gap smaller than that of the upper cladding layer but larger than that of the optical waveguide layer is interposed between the upper cladding layer and the optical waveguide layer.

5 Claims, 7 Drawing Sheets

PN JUNCTION OPTICAL MODULATING DEVICE HAVING A BUFFER LAYER WITH SMALL ENERGY GAP

BACKGROUND OF THE INVENTION

The present invention relates to an optical modulating device for modulating light incident thereto from the outside.

A gigabit-band ultra-high-speed optical transmission is now being expected to open up great possibilities for one of optical transmission systems which meet with the demand for large-capacity communications such as high-speed data communications and visual communications. In a 1-gigabit or more high-speed optical transmission in a 1.55 μm band in which the transmission loss by optical fiber is minimum, the wavelength dispersion characteristic as well as the loss characteristic of the optical fiber constitute forceful contributing factors to limiting the distance of transmission. On this account, much study has been given so far a dynamic single-wavelength laser which provides a small spectral width during modulation so as to arrest the damaging effect of wavelength dispersion on the distance of transmission.

In the case of direct modulation even by the dynamic single-wavelength laser such as a distributed feedback (DFB) laser, however, a chirping of several angstroms usually occurs, presenting the problem that the received pulse spreads owing to the wavelength dispersion by optical fiber and the chirping. As a solution to this problem there has recently been studied a system in which the output of a semiconductor laser is fixed and held in a state of limited spectral width and is subjected to high-speed modulation by an external optical modulating device.

Optical modulating devices proposed so far are those employing ferrodielectric materials such as LiNbO$_3$ and semiconductor optical modulating devices of the GaAs series and the InP series which can be integrated monolithically with single-wavelength lasers such as the DFB laser. Of these conventional optical modulating devices, an electroabsorption type one which applies an electric field to a semiconductor waveguide and modulates the intensity of light through utilization of the electroabsorption effect is receiving attention as the most promising device.

In the prior art structure, however, a device capacity increases to disturb a high-speed operation.

SUMMARY OF THE INVENTION

An object of the present invention is to provide an optical modulating device which is free from the fear of such an increase in the device capacity and permits a low-voltage high-speed modulation even if the intensity of incident light should rise.

According to the present invention, a pn junction is formed in the upper cladding layer and at least one buffer layer, which has an energy gap larger than that of the optical waveguide layer but smaller than the energy gap of the upper clad layer, is interposed between the optical waveguide layer and the upper cladding layer so that holes generated by light absorption are not trapped in the heterointerface.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, an example of prior art will first be described.

Figure 1:
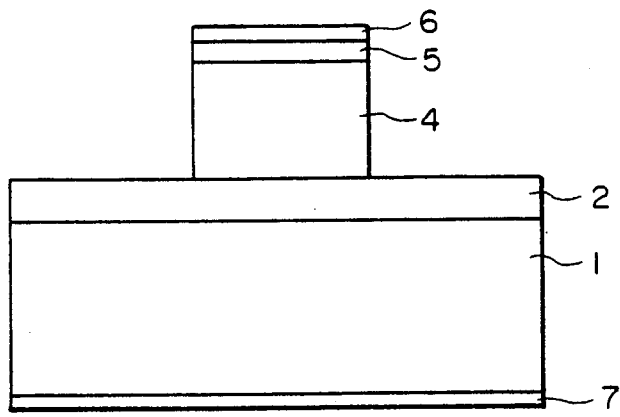
FIG. 1 is a sectional view showing the structure of a conventional electroabsorption type optical modulating device.

FIG. 1 is a sectional view of the conventional electroabsorption type optical modulating device. Formed on an n-type InP substrate 1 is an n$^-$-InGaAsP modulating waveguide layer 2 having a forbidden band wavelength of 1.45 μm, on which a p$^+$-InP upper cladding layer 4 and a p$^+$-InGaAsP contact layer 5 are laminated, and a p-side electrode 6 and an n-side electrode 7 are formed in contact with the p$^+$-InGaAsP contact layer 5 and the n-type InP substrage 1, respectively.

With this optical modulating device, light is incident to the InGaAsP modulating waveguide layer 2 and minus and plus voltages to the p- and n-side electrodes 6 and 8 are changed to vary the absorption coefficient of the InGaAsP modulating waveguide layer 2, thereby modulating the intensity of emitted light. When applying light of several mW into the absorption type optical modulating device, a phenomenon of an increase in the modulating voltage or decrease in the bandwidth is observed. To suppress the characteristic deterioration accompanying the incident of high-intensity light, it is customary in the prior art to reduce the number of carriers absorbed per unit length by selecting greater than 50 meV the difference, $\Delta Eg = Eg - h\nu$, between the photon energy hν of incident light and the energy gap Eg of the modulating waveguide layer and by increasing the device length up to about 1 mm.

However, since the conventional optical modulating device has the structure in which the p$^+$-InP upper cladding layer 4 is laminated directly on the n$^-$-InGaAsP modulating waveguide layer 2 to form a pn junction therebetween, a pn junction is formed in the modulating waveguide layer 2 by the diffusion thereinto of a dopant during crystal growth. Accordingly, in the prior art structure in which the p$^+$-InP upper cladding layer 4 is laminated directly on the n$^-$-InGaAsP modulating waveguide layer 2 to form the pn junction therebetween, since it is difficult to form the pn junction in the interface between the n⁻-InGaAsP modulating waveguide layer 2 and the p⁺-InP upper cladding layer 4 and the pn junction is formed in the optical waveguide layer 2, this increases the device capacity, making a high-speed operation impossible.

With reference to the accompanying drawings, the present invention will hereinafter be described in detail.

The principle of the invention will first be described.

It is considerable that the formation of a pn junction in the InP upper cladding layer would offer an easy solution to the problem of the conventional structure in which the p⁺-InP upper cladding layer 4 is formed directly on the n⁻-InGaAsP modulating waveguide layer 2 to form a pn junction therebetween. It has been found by the present inventors, however, that even if a pn junction is provided in the InP upper cladding layer, an increase in the intensity of incident light causes a significant increase in the modulating voltage. The reason for this will be described in detail.

Figure 2:
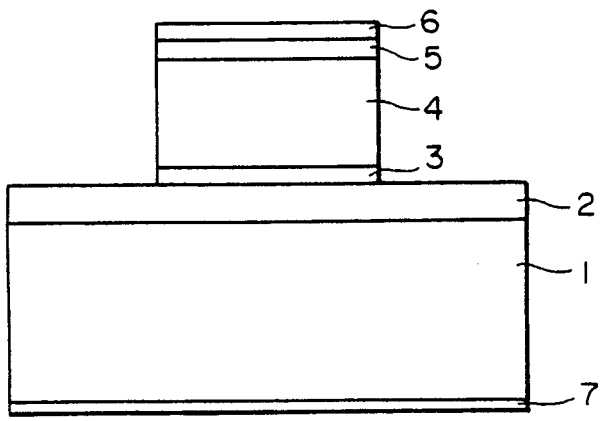
FIG. 2 is a sectional view showing the structure of the electroabsorption type optical modulating device, for explaining the principle of the present invention.

FIG. 2 is a sectional view of an electroabsorption type optical modulating device which has a pn junction in the upper cladding layer.

As is evident from FIG. 2, this device differs from the device of FIG. 1 in that a mesa-shaped n⁻-InP upper cladding layer 3 underlies the InP upper cladding layer 4, forming therein a pn junction.

Figure 3:
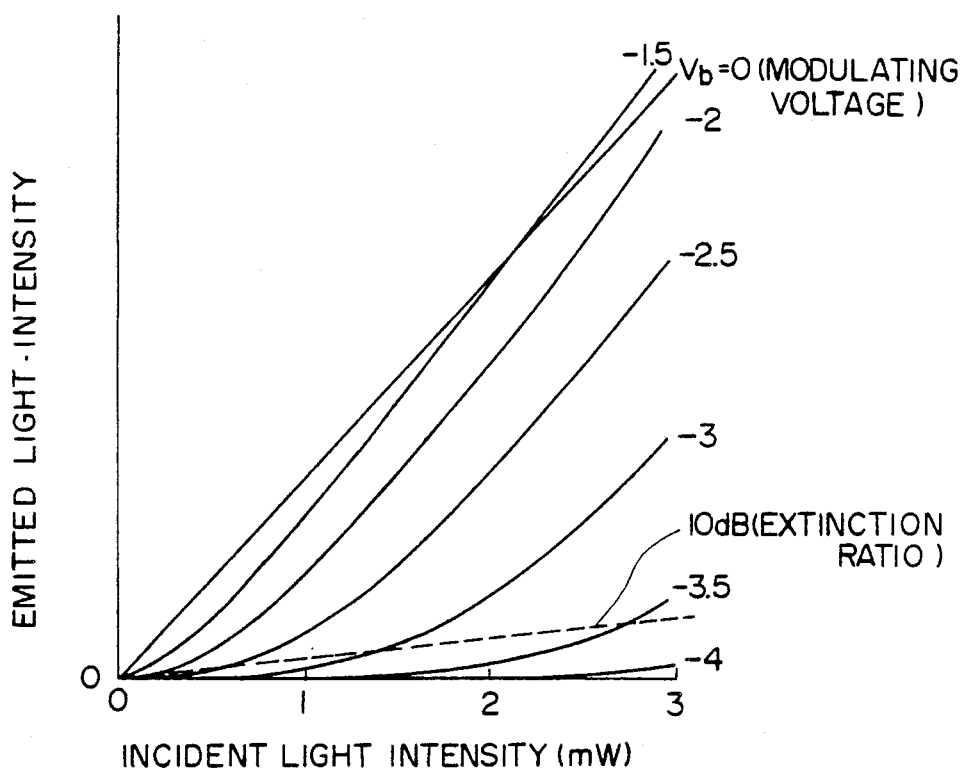
FIG. 3 shows an incident light intensity vs. emitted light intensity characteristic of the conventional electroabsorption type optical modulating device.

In FIG. 3 the relation of the emitted light intensity to the intensity of incident light of a 1.55 μm wavelength is shown, using the modulating voltage as a parameter, in the case of the FIG. 2 optical modulating device in which the device length was 1.02 mm and the aforementioned difference ΔEg was of 50 meV. It appears from FIG. 3 that, in this optical modulating device, as the incident light intensity increases from 0.2 mW to 3 mW, a voltage which provides an extinction ratio of 10 dB increases from 2 V to 3.5 V or more.

As a result of experimental studies of the cause of the above phenomenon, it has been found that in the optical modulating device of FIG. 2 the heterointerface between the n⁻-InGaAsP modulating waveguide layer 2 and the n⁻-InP upper cladding layer 3, which is present in a depletion layer, has a great influence on the increase in the modulating voltage.

Figure 4A:
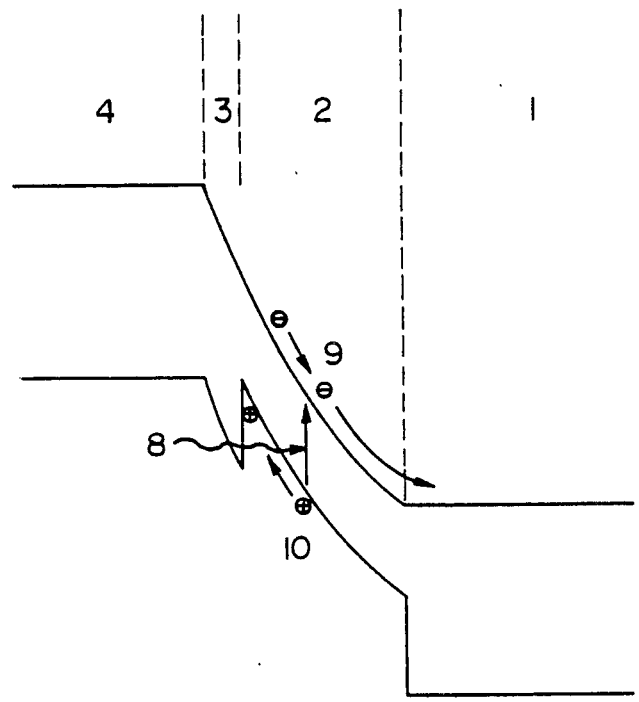
FIG. 4A shows the energy band of the prior art example when the intensity of incident light is low.
Figure 4B:
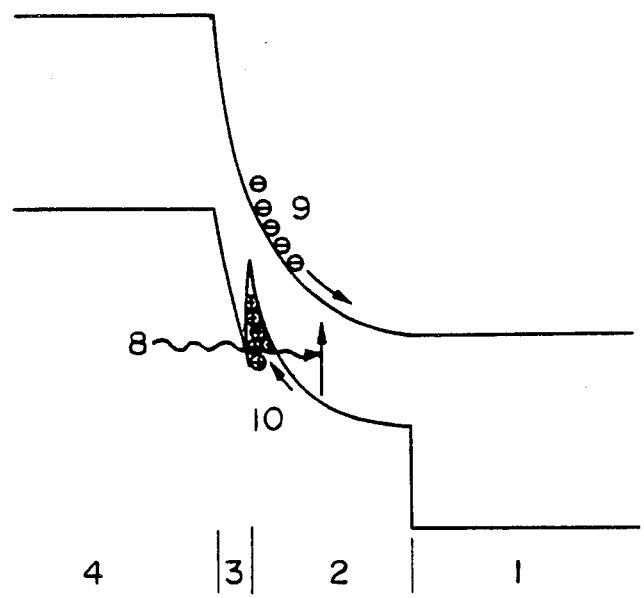
FIG. 4B shows the energy band of the prior art example when the intensity of incident light is high.

This will hereinbelow be described. The increase in the modulating voltage is attributable partly to the accumulation of holes in energy band discontinuity points of the valence band in the boundary (a heterointerface) between the n⁻-InP (energy gap: Eg=1.35 eV) 3 and the n⁻-InGaAsP (Eg=0.855 eV) 2 as described previously. FIG. 4A shows the energy band of the conventional optical modulating device in a case where the quantity of incident light is small. Incident light 8 of a 1.55 μm band is absorbed by the n⁻-InGaAsP modulating waveguide layer 2, creating electrons 9 and holes 10. The energy gradient corresponds to the electric field intensity. FIG. 4B shows the energy band in the case of incidence of several mW or more high-intensity light. Of the electrons 9 and the holes 10 generated by the absorption of light, the electrons 9 are momentarily discharged to an external circuit because the conduction band has substantially no energy barriers, but the holes 10 are trapped by energy barriers of the valence band at the heterointerface between the n⁻-InP 3 and the n⁻-InGaAsP 2. Where the intensity of incident light is low, the number of holes trapped is small, and consequently, the distribution of electric field intensity in the waveguide undergoes no substantial influence and light absorption occurs throughout the InGaAsP waveguide layer 2, as shown in FIG. 4A. However, as the number of holes increases with an increase in the intensity of incident light, the applied electric field from the outside concentrate at the heterointerface where holes are present in large quantities, so that the electric field intensity in other portions is lowered and no light absorption occurs in some regions (FIG. 4B), allowing the transmittance of light to increase. As a voltage is further applied, the accumulation of holes at the heterointerface proceeds, and at the voltage point where the number of holes is at a maximum, the waveguide layer becomes most transparent. Even if a voltage is further applied, however, holes are no longer accumulated at the heterointerface and the waveguide layer exhibits its normal absorption characteristic.

The phenomenon that the light transmission characteristic has peaks of the same number as heterointerface is similarly observed in the cases of one, two and three heterointerfaces; so that the above explanation is considered justifiable. That is to say, a large number of holes staying at the heterointerface become space charges and distorts the band structure, causing an increase in the modulating voltage at the time of incidence of several mW or more high-intensity light. Thus it has been provide that the effect of accumulation of holes at the heterointerface has a great influence on an increase in the modulating voltage.

As described above, even if an optical modulating device, which merely has a pn junction in the InP upper cladding layer, is structured so that the number of carriers absorbed per unit length by selecting the energy gap of the optical waveguide layer 2 50 meV or more larger than the incident light energy and selecting the device length 1 mm or more, the presence of the pn junction in the upper cladding layer allows the band structure to be distorted by the accumulation of holes at the heterointerface, leading to the defect of a remarkable increase in the modulating voltage with an increase in the intensity of incident light.

In view of the above, according to the present invention, a pn junction is formed in the upper cladding layer and at the same time at least one buffer layer, which has an energy gap greater than that of the optical waveguide layer but smaller than the energy gap of the upper cladding layer, is inserted between these layers so as to prevent that holes created by light absorption are trapped at the heterointerface.

Figure 5A:
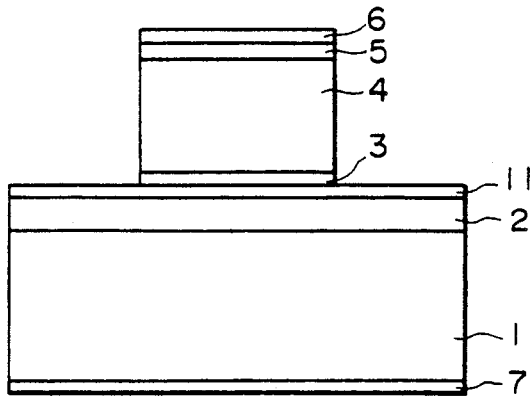
FIGS. 5A and 5B are a sectional view illustrating the basic structure of the optical modulating device of the present invention and its energy band diagram.
Figure 5B:
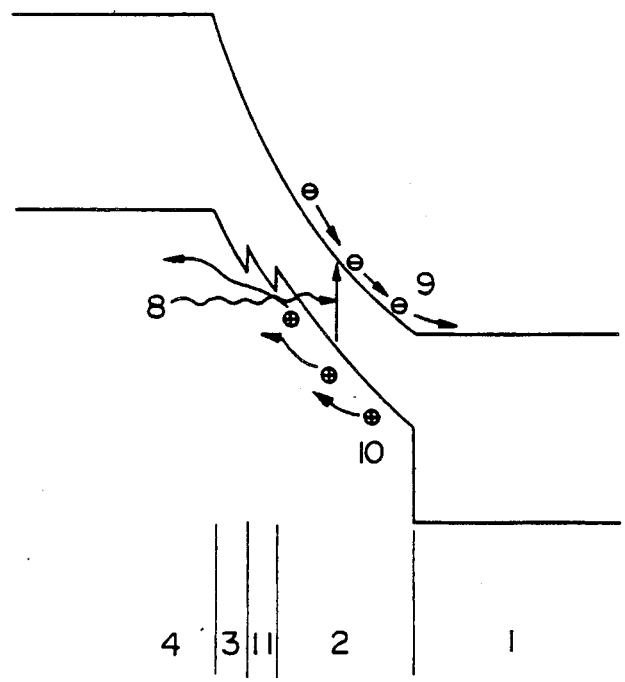

FIG. 5A is a sectional view of the optical modulating device of the present invention, for explaining its principle. The illustrated device differs from the prior art example in that there is interposed between the n⁻-InGaAsP optical waveguide layer 2 (forbidden band wavelength: 1.45 μm) of 0.3 μm thickness and the n⁻-InP upper cladding layer (forbidden band wavelength: 0.92 μm) of 0.1 μm thickness a thin n⁻-InGaAsP buffer layer 11 (forbidden band wavelength: 1.2 μm, thickness: 0.1 μm) which has an energy gap intermediate between those of the optical waveguide layer 2 and the upper cladding layer 3. FIG. 5B shows the energy band of the optical modulating device of the present invention. Since there is sandwiched between the optical waveguide layer 2 and the upper cladding layer 3 the buffer layer 11 of an energy gap intermediate between those of the optical waveguide layer 2 and the cladding layer 3, the band discontinuity of the valence band occurs at two stages as depicted in FIG. 5B. Holes generated by light absorption, even if trapped at the respective heterointerfaces, can easily get over energy barriers by thermal excitation at room temperature; namely, the holes easily migrate to the p+-InP upper cladding layer 4 and are momentarily discharged to an external circuit, thus exerting no influence on the band structure.

Figure 6:
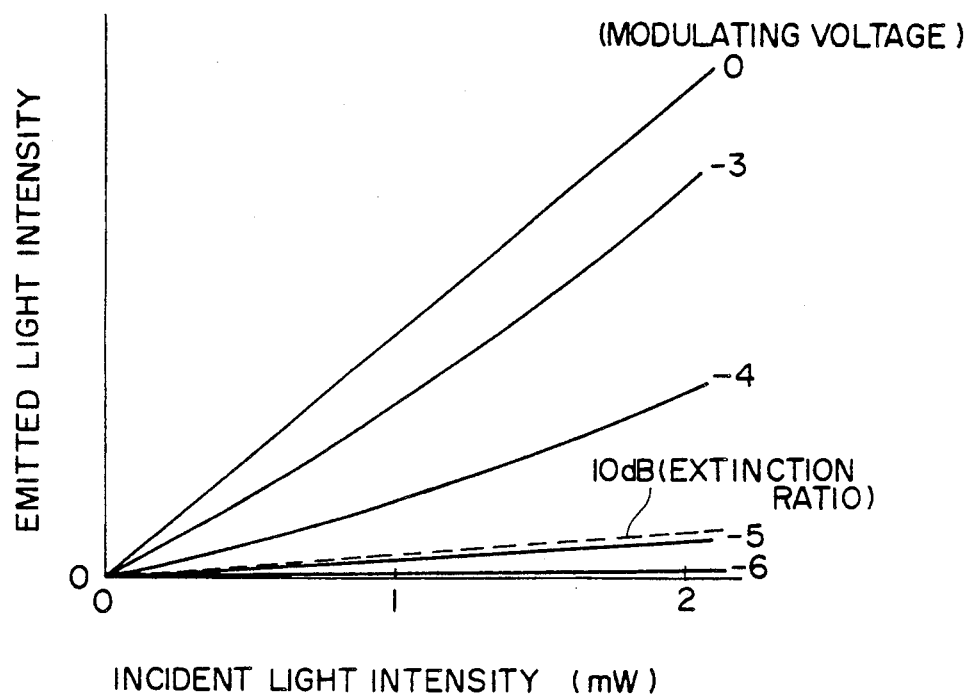
FIG. 6 shows the incident light intensity vs. emitted light intensity characteristic of the optical modulating device of the present invention.

FIG. 6 shows the incident light intently vs. emitted light intensity characteristic of the optical modulating device of the present invention (device length: 1.17 mm, ΔEg: 50 meV), using the modulating voltage as a parameter. Comparison of FIGS. 3 and 6 reveals that the input-output characteristic is markedly improved in FIG. 6. In other words, the voltage which provides the same extinction ratio remained substantially unchanged irrespective of the intensity light.

According to the present invention, it is therefore possible to materialize an optical modulating device which, even if the intensity of incident light increase, permits a low-voltage, high-speed modulation without the necessity of increasing the device capacity.

While the device of FIG. 5A has only one buffer layer 11, it is also possible to insert a multilayer buffer layer 12 the energy gap of which increases stepwise from the optical waveguide layer 2 to the upper cladding layer 3. This can be implemented by inserting between the n⁻-InGaAsP optical waveguide layer 2 and the n⁻-InP upper cladding layer 3, for example, an n⁻-InGaAsP buffer layer 12 (not shown) in which the forbidden band wavelength continuously varies from 1.45 to 0.92 μm. With this structure, substantially no band discontinuity of the valence band is present and the holes created by light absorption are hardly trapped at the heterointerface and are discharged to an external circuit.

With this structure, it is possible to implement an optical modulating device which is capable of a low-voltage, high-speed modulation irrespective of an increase in the intensity of incident light, as is the case with the device of FIG. 5A which employs one buffer layer 11.

Although the materials used have been described to be the InGaAsP/InP series, other materials of the AlGaAs/GaAs series and AlGaAs/InP series can equally be employed. Moreover, a multiple quantum well layer made of such materials can also be used, in which case the energy gap referred to above becomes an effective energy gap which depends on the quantum level. Furthermore, a stripe structure for transversal mode stabilization has been described to be a strip load type one, but a buried stripe structure, a ridge waveguide stripe structure, and other structures can all be employed.

Next, a description will be given of a structure in which a high performance modulating device capable of low-voltage, high-speed modulation even for high-intensity incident light (patent applications Nos. 42198/88 to 42200/88) or a high performance modulating device of little band deterioration (patent application No. 195840/88), already filed by the same applicant as this application, and the buffer layer 12 (11) characteristic of the present invention are combined.

(EMBODIMENT 1)

Three patent applications have been filed by the same applicant as this application on the high performance modulating device capable of low-voltage, high-speed modulation even for high-intensity incident light (patent applications Nos. 42198/88 to 42200/88), and the following will describe a structure in which an embodiment disclosed in patent application No. 42199/88, as a typical example, and the present invention are combined.

According to patent application No. 42199/88, by varying continuously or stepwise the energy gap of the optical wave-guide in its thicknesswise direction so that nonuniformity of the absorption coefficient due to a difference in the electric field distribution in the optical waveguide is corrected to provide substantially a constant absorption coefficient in its thicknesswise direction, an overlap of the light distribution and the absorption coefficient is enlarged to widen the band by a modulating voltage drop and the reduction of the device length and to make the absorption uniform. By this, the space charge effect by locally excess carriers, which poses a problem at the time of receiving high-intensity incident light, is suppressed, permitting high-speed modulation.

Next, a concrete combined structure will be described.

Figure 7:
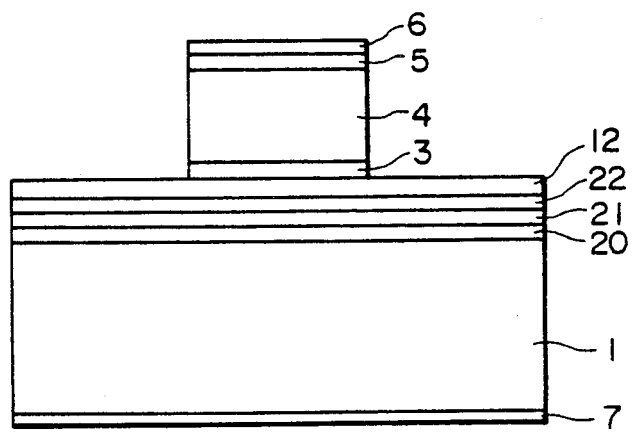
FIGS. 7, 8 and 9 are sectional views illustrating examples of the optical modulating device of the present invention.

FIG. 7 illustrates in section a first embodiment of the optical modulating device of the present invention.

This device differs from that of FIG. 5A in that the n⁻-InGaAsP optical waveguide layer 2 is made up of three layers (20, 21, 22) of different energy gaps and in that the multilayer buffer layer 12 whose energy gap varies continuously or stepwise is laminated on the optical waveguide 2. For the sake of brevity, however, only one layer is shown.

The optical waveguide layers 20, 21 and 22 are 0.2 μm thick and have energy gaps which are larger than the incident light energy hν by 50, 55 and 60 meV, respectively. The number of such optical waveguide layers need not always be three but may be two or more.

(EMBODIMENT 2)

Figure 8:
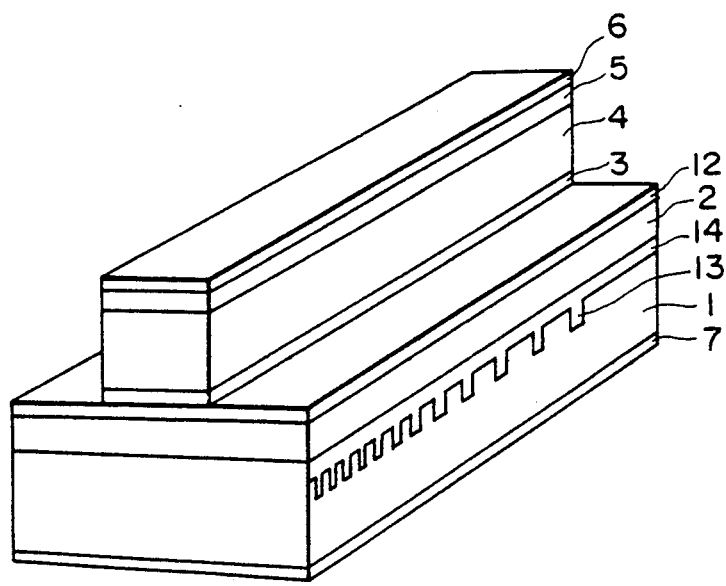

FIG. 8 is a sectional view of a second embodiment of the optical modulating device of the present invention.

This embodiment is a combination of the buffer layer 12 of the present invention and the optical modulating device of patent application No. 195840/88 in which high- and low-impurity concentration regions are formed alternately with each other in the direction of travel of light, with the high-impurity concentration regions enlarged one after another, so as to absorb substantially the same number of carriers throughout the optical waveguide layer 2 between its light incidence and emitting end faces. More specifically, as shown in FIG. 8, the n-type InP substrate 1 has corrugations 13 formed in its top face, over which an n⁻-InP lower cladding layer 14, the n⁻-InGaAsP modulating waveguide layer 2 and the multi-layer n⁻-InGaAsP buffer layer 12 are laminated. The other portions of this structure are identical with those in FIG. 5A. By combining the buffer layer 12 with the structure in which the spacing of the corrugations 13 increases stepwise in the direction from the light incidence end face to the light emitting end face, it is possible to obtain an optical modulating device which is free from the band deterioration, an increase in the modulating voltage and an increase the device capacitance when high-intensity light is incident (EMBODIMENT 3)

Figure 9:
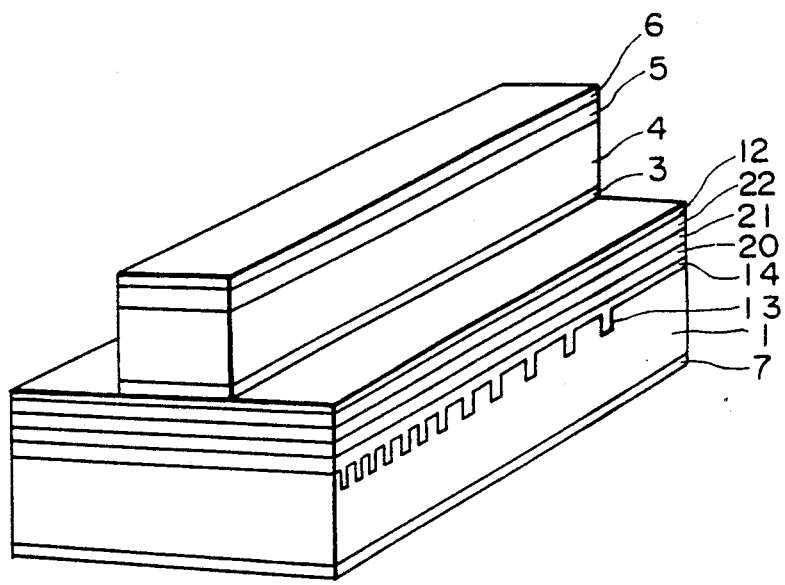

FIG. 9 is a sectional view of a third embodiment of the optical modulating device of the present invention which is a combination of the structures of FIG. 5A and Embodiment 1 and 2.

In Embodiment 3, the n-type InP substrate 1 has the corrugations 13 formed in its top face, on which are laminated the n⁻-InP lower cladding layer 14, the n⁻-InGaAsP modulating waveguide layers 20, 21 and 22 of different energy gaps and the multilayer n⁻-InGaAsP buffer layer 12, on which, in turn, are laminated the mesa-shaped n⁻-InP upper cladding layer 3, the p⁺-InP upper cladding layer 4, which forms a pn junction at the interface between it and the n⁻-InP upper cladding layer 3, and the p⁺-InGaAsP contact layer 5. Further, the p- and n-side electrodes 6 and 7 are formed in contact with the p⁺-InGaAsP contact layer 5 and the n-type InP substrate 1, respectively.

With the structure of Embodiment 3, since an ideal uniformity of the absorption coefficient is attained, the device capacitance does not increase and the space charge effect by locally excess carriers which poses a problem when high-intensity light is incident is suppressed, permitting high-speed modulation at a lower voltage.

While the above description has been described of the structure in which a typical example of the device disclosed in each of patent application No. 42198/88 to 42200/88 or patent application No. 195840/88 and the present invention are combined, other combinations may also be used. Further, the buffer layer 12 in the present invention may also be substituted with the single layer buffer layer 11.

As described above, according to the present invention, a pn junction is formed in the upper cladding layer and at least one buffer layer 11 (12) of an energy gap greater than that of the optical waveguide layer 2 but smaller than that of the upper cladding layer 3 is interposed between them. This lessens the influence of the band discontinuity of the valence band, permits an easy migration of holes generated by light absorption to an external circuit, and prevents distortion of the band structure by the absorbed carriers. As a result of this, an optical modulating device can be obtained which is capable of low-voltage, high-speed modulation even if the intensity of incident light increases.

The optical modulating device using the single-layerd buffer layer 11 is easy of manufacture.

The optical modulating device having the buffer layer 12 of the continuously varying energy gap functions as a high performance optical modulating device which is free from distortion of the band structure by the absorbed carriers.

With the structure in which the energy gap of the optical waveguide layer 2 in its thicknesswise direction varies continuously or stepwise so that the absorption coefficient is substantially constant in the thicknesswise direction, the space charge effect by locally excess carriers, which poses a problem when receiving high-intensity light, is suppressed, permitting low-voltage, high-speed modulation.

With the structure in which in the portion in contact with the optical waveguide layer 2, pluralities of low-impurity concentration regions and high-impurity concentration regions are disposed alternately with each other in the direction of travel of light and the distribution density of the high-impurity concentration regions increases in the direction of travel of light, it is possible to obtain an optical modulating device which is free from the band deterioration, an increase in the modulating voltage and an increase in the device capacitance even when high-intensity light is incident.

With the structure in which the energy gap of the optical waveguide layer 2 in its thicknesswise direction varies continuously or stepwise to provide the substantially the same absorption coefficient in the thicknesswise direction, pluralities of low-impurity concentration regions and high-impurity concentration regions are disposed alternately with each other in the direction of travel of light in the portion adjacent the optical waveguide layer 2 and the distribution density of the high-impurity concentration regions increases in the direction of travel of light, it is possible to prevent an increase in the device capacitance and suppress the space charge effect by locally excess carriers which poses a problem when high-intensity light is incident, thereby enabling high-speed modulation to be achieved at lower modulating voltage.

As described above, the optical modulating device of the present invention is applicable to ultra-high-speed, long-distance fiber optic communications in the gigabit band, and hence is of great utility in practical use.

What we claim is:

1. An optical modulating device which has, on a substrate directly or via a lower cladding layer, an optical waveguide layer, an upper cladding layer of a refractive index smaller than that of the optical waveguide layer and a pair of electrodes for applying an electric field across the substrate and the upper cladding layer and in which the absorption coefficient for incident light of a fixed intensity incident to the optical waveguide layer is varied by the electric field applied across the pair of electrodes to perform the modulation of the light and the modulated light is emitted from a light emitting end face of the optical waveguide layer, characterized in that a pn junction is formed in the upper cladding layer and at least one buffer layer of an energy gap smaller than that of the upper cladding layer but larger than that of the optical waveguide layer is interposed between the upper cladding layer and the optical waveguide layer.

2. An optical modulating device according to claim 1, characterized in that the energy gap of the buffer layer diminishes continuously or stepwise from the energy gap of the upper cladding layer to the energy gap of the optical waveguide layer.

3. An optical modulating device according to claim 1, characterized in that the energy gap of the optical waveguide layer in its thicknesswise direction is varied continuously or stepwise in a manner to make the absorption coefficient substantially constant in the thicknesswise direction.

4. An optical modulating device according to claim 1, characterized in that in a portion adjacent the optical waveguide layer, pluralities of low-impurity concentration regions and high-impurity concentration regions are disposed alternately with each other in the direction of travel of light, the distribution density of the high-impurity concentration regions increasing in the direction of travel of light.

5. An optical modulating device according to claim 1, characterized in that the energy gap of the optical waveguide layer in its thicknesswise direction is varied continuously or stepwise in a manner to make the absorption coefficient substantially constant in the thicknesswise direction and, in a portion adjacent the optical waveguide layer, pluralities of low-impurity concentration regions and high-impurity concentration regions are disposed alternately with each other in the direction of travel of light, the distribution density of the high-impurity concentration regions increasing in the direction of travel of light.

* * * * *